United States Patent
Zhang et al.

(10) Patent No.: US 9,124,765 B2
(45) Date of Patent: Sep. 1, 2015

(54) METHOD AND APPARATUS FOR PERFORMING A VIDEO CONFERENCE

(71) Applicant: Futurewei Technologies, Inc., Plano, TX (US)

(72) Inventors: DongQing Zhang, Plainsboro, NJ (US); Zhenyu Wu, Plainsboro, NJ (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 61 days.

(21) Appl. No.: 14/142,470

(22) Filed: Dec. 27, 2013

(65) Prior Publication Data

US 2014/0184721 A1    Jul. 3, 2014

Related U.S. Application Data

(60) Provisional application No. 61/746,445, filed on Dec. 27, 2012.

(51) Int. Cl.
| | |
|---|---|
| *H04N 7/14* | (2006.01) |
| *H04N 7/15* | (2006.01) |
| *H04N 5/272* | (2006.01) |
| *G06F 3/048* | (2013.01) |

(52) U.S. Cl.
CPC .................. *H04N 7/15* (2013.01); *G06F 3/048* (2013.01); *H04N 5/272* (2013.01)

(58) Field of Classification Search
CPC ........................................................ H04N 7/14
USPC .......... 348/14.01, 14.02, 14.07, 14.12, 14.03, 348/14.08
See application file for complete search history.

(56) References Cited

U.S. PATENT DOCUMENTS

| | | | |
|---|---|---|---|
| 2007/0040898 A1* | 2/2007 | Lee et al. | 348/14.08 |
| 2008/0300010 A1* | 12/2008 | Border et al. | 455/556.1 |
| 2011/0096135 A1* | 4/2011 | Hegde et al. | 348/14.07 |
| 2012/0092438 A1* | 4/2012 | Guzman Suarez et al. | 348/14.03 |

* cited by examiner

Primary Examiner — Olisa Anwah
(74) Attorney, Agent, or Firm — Futurewei Technologies, Inc.

(57) ABSTRACT

A method for performing a video conference in a mobile phone is provided. The video conference involves a plurality of conferencing devices that display presentation content and a video image of one or more participants in the video conference. The mobile phone receives a first and second real-time transport protocol (RTP) packets including a video image of a participant and presentation content in the video conference, respectively. The video image of the participant includes a face portion of the participant and a background portion. The mobile phone decodes the video image of the participant and the presentation content, extracts the face portion of the participant from the video image of the participant, overlays the face portion of the participant over a portion of the presentation content to form a composite image, and displays the composite image on a display device of the mobile phone.

18 Claims, 3 Drawing Sheets

METHOD AND APPARATUS FOR PERFORMING A VIDEO CONFERENCE

CROSS-REFERENCE TO RELATED APPLICATION

This application claims priority of provisional application No. 61/746,445, filed Dec. 27, 2012, entitled, "System and Method for Experience Enhancement with Content Fusion", which is incorporated herein by reference in its entirety.

BACKGROUND

A video conference may be a conference that allows two or more conferencing devices to interact via video and audio transmissions. The video conferencing uses telecommunications of audio and video to bring people at different sites together for a meeting. This may include a conversation between two people in private offices (e.g., point-to-point) or involve several sites (e.g., multi-point) with more than one person in large rooms at different sites. Besides the audio and video transmission of meeting activities, videoconferencing can be used to share documents, computer-displayed information, and whiteboards etc.

The conferencing devices may display different types of media content using various graphic user interface (GUI) windows. For example, some GUI windows might be used to display video images of participants in the video conference, one or more GUI windows might be used to display presentation (e.g., slides, whiteboard) in the video conference. Generally, the participants' video images and presentation are displayed side by side. If a participant uses a personal computer or a laptop to anticipate the conference, the participant can view the video images and the presentation in separate windows and all are of reasonable size and good quality.

However, in some situations, the participant has to use a mobile phone with a relatively small size screen to participate in the conference. The size of the display of the mobile phone is small as compared with the size of personal computers or laptops. As shown in FIG. 1, the mobile phone 100 has a display device 110. The display device 110 displays the presentation in the GUI window 113 and video images of, for example, two participants in the GUI windows 111 and 112. Since the size of the display device 110 is relatively small, displaying when the video image of the participants and the presentation are displayed on the display device 110 of the mobile phone 100, the participant who is using the mobile phone 100 cannot see the video images and the presentation with reasonable sizes (e.g., the video images and the text of the presentation are too small to see). As a result, the user experience is decreased.

SUMMARY

Embodiments of the present invention provide a method, apparatus and a non-transitory computer-readable medium, for performing a video conference.

A mobile phone for use in a video conference in which a plurality of conferencing devices display a presentation content and a video image of one or more participants in the video conference. The mobile phone includes a receiver and a processor. The receiver is configured to receive a first and second real-time transport protocol (RTP) packets including a video image of a participant and presentation content in the video conference, respectively. The video image of the participant includes a face portion of the participant and a background portion. The processor is configured to decode the video image of the participant and the presentation content, extract the face portion of the participant from the video image of the participant, overlay the face portion of the participant over a portion of the presentation content to form a composite image, send the composite image to a display device for display.

A method for performing a video conference in a mobile phone is provided. The video conference involves a plurality of conferencing devices that display presentation content and a video image of one or more participants in the video conference. The mobile phone receives a first and second real-time transport protocol (RTP) packets including a video image of a participant and presentation content in the video conference, respectively. The video image of the participant includes a face portion of the participant and a background portion. The mobile phone decodes the video image of the participant and the presentation content, extracts the face portion of the participant from the video image of the participant, overlays the face portion of the participant over a portion of the presentation content to form a composite image, and displays the composite image on a display device of the mobile phone.

A non-transitory computer-readable medium storing instructions executable by a processor in a mobile phone to perform the operations. The processor receives a first and second real-time transport protocol (RTP) packets including a video image of a participant and presentation content in the video conference, respectively. The video image of the participant includes a face portion of the participant and a background portion. The processor decodes the video image of the participant and the presentation content, extract the face portion of the participant from the video image of the participant, overlay the face portion of the participant over a portion of the presentation content to form a composite image, and sends the composite image to a display device of the mobile phone for display.

BRIEF DESCRIPTION OF THE DRAWINGS

To illustrate the technical solutions in the embodiments of the present invention or in the prior art more clearly, the following briefly describes accompanying drawings required for describing the embodiments or the prior art.

DETAILED DESCRIPTION OF THE EMBODIMENTS

To make the objectives, technical solutions, and advantages of the present invention more clear, the following clearly and completely describes the technical solutions according to the embodiments of the present invention with reference to the accompanying drawings in the embodiments of the present invention.

The embodiments of the present invention relate to video conferences in which a mobile phone is used as a conferencing device. In one embodiment, a video signal (e.g., image) may be adjusted to correspond to a display device of the mobile device. Adjusting a video signal to correspond to the display device of the mobile phone may be beneficial because video conference systems generally provide a full size (e.g., a "life size") image on a screen appropriate for room based systems. For a conference participant using a mobile phone, rendering the full size image onto a small screen is not that useful. The embodiments of the present invention relate to focusing on one or more objects of attention in the participant video images and presentation content, extracting the objects of attention and combining the objects of attention to form a video signal that fits the display device of the mobile phone, therefore allowing the video conference participant using the mobile phone to view a close up image or video of the video conference participant and the presentation content.

Figure 1:
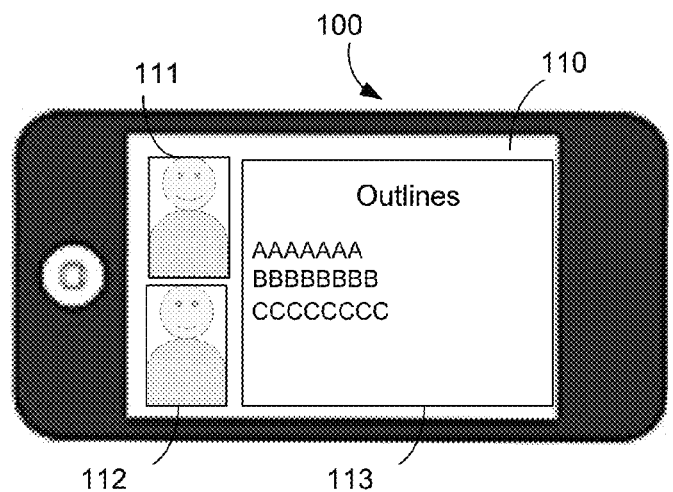
FIG. 1 is a schematic diagram of a mobile phone displaying images of participants and presentation in a video conference in the prior art.
Figure 2:
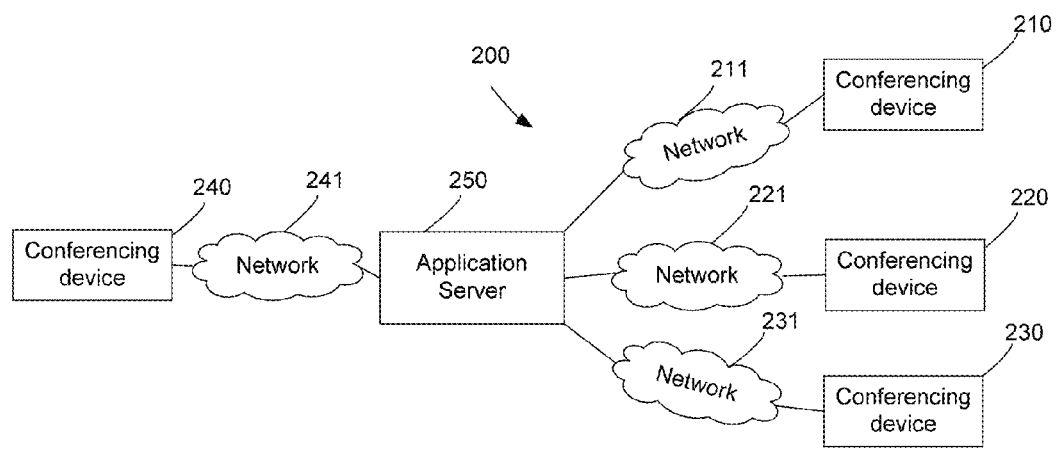
FIG. 2 is a schematic diagram of a video conference system according to an embodiment of the present invention.

FIG. 2 illustrates a video conference system 200 according to an embodiment of the present invention. The video conference system 200 includes a plurality of conferencing devices 210-240 and an application server 250. The application server 250 supports a video conference between participants using the conferencing devices 210-240. The server 250 connects the conferencing devices 210-240 and allows the participants to use the conferencing devices 210-240 during the video conference to view video images of one or more participants, and a presentation (e.g., slides, whiteboard) presented in the video conference, etc.

The conferencing devices 210-240 communicate with the application server 250 via networks 211, 221, 231 and 241, respectively. Optionally, the conferencing devices 210-240 can communicate with each other over, for example, a local area network (not shown). As used herein, the term "communicate with" includes directly connected or indirectly connected through one or more intermediary components. The Intermediary components may include hardware or software. For example, the conferencing device 210 may be connected to the application server 250 via one or more intermediary components, such as cellular networks or servers. Although four conferencing devices are illustrated in this example for simplicity, it will be understood that other number of conferencing devices may be included in the video conference system 200.

The conferencing devices 210-240 may be mobile telephones, desktop computers, laptops, personal digital assistants (PDAs), tablets, book viewers, remote conferencing systems (e.g., telepresence system), or other devices that are operable to participate in a video conference. In the example of FIG. 2, the conferencing devices 210-240 are depicted as a mobile telephone (e.g., an iPhone sold by Apple, Inc.), a desktop computer, a laptop and a telepresence system, respectively. The telepresence system is an endpoint for group meetings, creating an environment for multiple people to meet in one location, and to be joined by additional people. For example, the telepresence system may integrate three 65-inch plasma screens and a specially designed table that seats a plurality of participants on one side of the table. The telepresence system may support life-size images with ultra-high-definition video and spatial audio and may include one or more cameras, microphones, and speakers. In the embodiment shown in FIG. 2, some participants use the conferencing devices 210-230 respectively to attend the video conference, and other participants use the telepresence system 240 to attend the video conference. In this embodiment, each of the conferencing devices 210-230 can display the video images of participants attending the video conference by using the telepresence system 240, and the presentation in the telepresence system 240.

The application server 250 may be a video gateway, telepresence server, web server, video conferencing server, or other device or system operable to support a video conference. In the example of FIG. 2, the application server 250 may include a multipoint control unit (MCU) which is used to manage videoconferencing sessions between the conferencing devices 210-240. Generally, the MCU can receive video streams from one or more of the conferencing devices 210-240. One or more of these video streams may be combined by the MCU into one or more combined video streams which are sent by the MCU to appropriate conferencing devices to be displayed on their respective display screens.

The networks 211, 221, 231 and 241 can be, but is not limited to, a packet switched network, a circuit switched network, or a combination of the two. In the embodiments of the present invention, communications between the MCU and the conferencing devices 210-240 over the networks 211, 221, 231 and 241 can be based on a real-time transport protocol (RTP). It is noted that other communication protocols such as H.320, H.324, H.323, session initial protocol (SIP) can also be used.

RTP provides an end-to-end network transport function suitable for applications transmitting real-time data, such as audio, or video data. When RTP is used to transport real-time data over IP networks, the transmission of data between network endpoints (source and destination) is accomplished by establishing RTP stream(s) between the interested parties. An RTP stream can be defined as a one-directional stream of data from a given source to a given destination, characterized by source and destination attributes: source IP address, source UDP port, destination IP address, and destination UDP port. These attributes uniquely identify a particular RTP stream.

Figure 3:
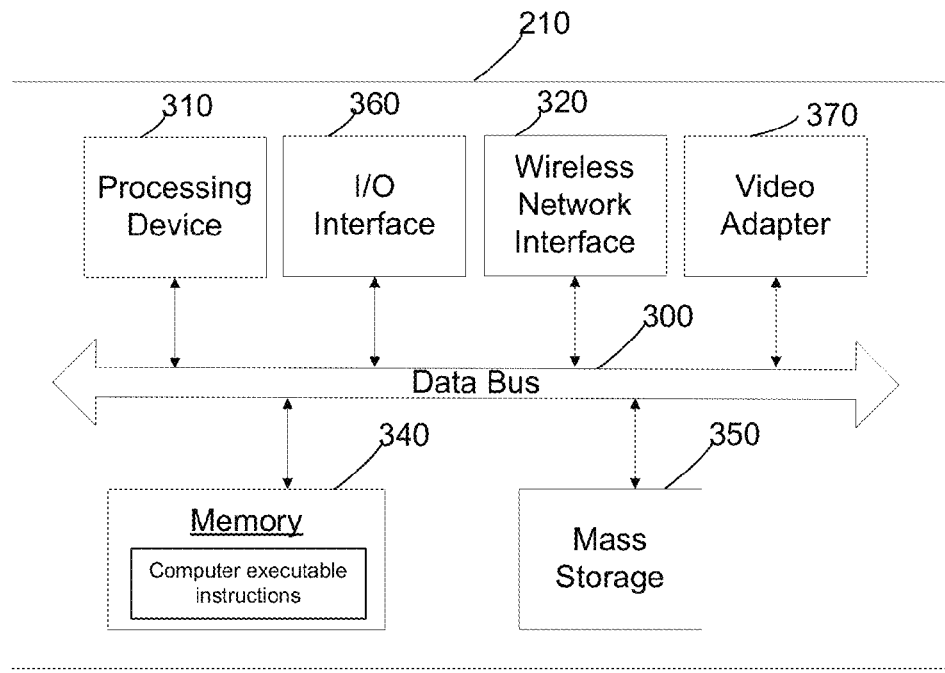
FIG. 3 is a block diagram of the mobile phone shown in FIG. 2.

FIG. 3 illustrates an embodiment of the mobile phone 210 capable of implementing aspects of the disclosure. The mobile phone 210 may, for example, include a processing device 310, a wireless network interface 320, an input/output (I/O) interface 360, a video adapter 370, a memory 340 and a mass storage 350. Each of these devices is connected across a data bus 300. The I/O interface 360 provides any number of interfaces for the input and output of data. For example, the I/O interface 360 may interface with a microphone, a speaker and a camera, etc. The microphone may be any acoustic to electric transducer or sensor operable to convert sound into an electrical signal. For the purposes of the video conference system 200, the microphone may capture the voice of the participant using the mobile phone 210 and transform it into an audio signal for transmission to the other conferencing devices 220-240. The microphone may be combined with any other component of the mobile phone 210, for example, the camera of the mobile phone 210. The camera may include any suitable hardware and/or software to facilitate capturing an image of the participant who is using the mobile phone 210 and a surrounding area. The camera may capture and transmit the image of the participant as a video signal for display on the display devices of the conferencing devices 220-240.

The video adapter 370 provides an interface to couple a display device of the mobile phone 210. The display device may be a touch screen, a liquid crystal display (LCD) or other display device for displaying information (e.g., images, text, video, or data).

The wireless network interface 320 includes various components used to transmit and/or receive data over the network 211. By way of example, the wireless network interface 320 may include, for example, a modulator/demodulator (e.g., a modem), wireless (e.g., radio frequency (RF)) transceiver, a telephonic interface, a bridge, a router, or a network card, etc. The mobile phone 210 can use the wireless network interface 320 to communicate with the MCU and/or the conferencing devices 220-240 over the network 211. In at least some embodiments, the wireless network interface 320 includes a transceiver (not shown) coupled to an antenna. The transceiver can receive or transmit data packets (e.g., the RTP packets) from/to the MCU or the conferencing devices 220-240.

The processing device 310 may include a microprocessor, a macro processor, or one or more application specific integrated circuits (ASICs), or a plurality of suitably configured digital logic gates, such as field-programmable gate arrays (FPGA), or generally any device for executing instructions. The processing device 310 may include a decoder which is configured to decode the media content (e.g., video and/or audio) received from the MCU or one or more of the conferencing devices 220-240. The processing device 310 may identify and extract key elements (e.g., text, face) from the media contents, and combine and/or rearrange the key elements to form a video signal for display on the display device of the mobile phone 210. The processor device 310 may also scale down the video signal and/or lower down the resolution of the video signal in order to fit the relatively small-size display device of the mobile phone 210.

The memory 340 may include a volatile memory element (e.g., random-access memory (RAM), such as DRAM, and SRAM, etc.) and a nonvolatile memory element (e.g., flash, read only memory (ROM), nonvolatile RAM, etc.). The mass storage 350 may also include a nonvolatile memory element (e.g., flash, hard drive, tape, CDROM, etc.). The memory 340 includes software which may include one or more separate programs, each of which includes a listing of executable instructions for implementing logical functions. Specifically, the software can include networking related software including a communications protocol stack which includes a physical layer, a link layer, a network layer and a transport layer. The network related software may be used by the processing device 310 to communicate with the MCU and/or the conferencing devices 220-240 through the wireless network interface 320 and can further include instructions that cause the processing device 310 to perform the operations described herein in connection with FIG. 4. It should be noted, however, that the operations can also be implemented in hardware or a combination of software and hardware. The memory 340 may be located inside or outside the processing device 310, and may be coupled to the processing device 310 by using various well-known means.

Figure 4:
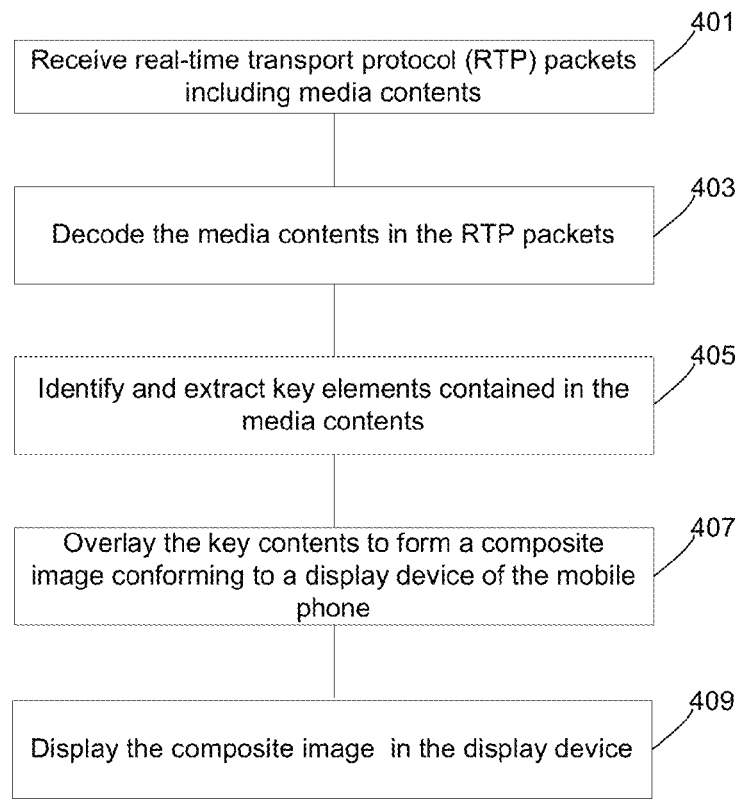
FIG. 4 is a flow chart of a method for performing a video conference according to an embodiment of the present invention in connection with the network environment shown in FIG. 2.

FIG. 4 illustrates a method for performing a video conference in the mobile phone 210 according to an embodiment of the present invention in connection with the network environment shown in FIG. 2. The exemplary method enables better user experiences when using small display device. In the improved user experiences, users can see both the presentation and participants clearly on display device of the mobile phone 210.

At step 401, the mobile phone 210 receives media contents from one or more of the conferencing devices 220-240. The media contents include, for example, video images of the participants in the video conferencing, and presentation content (e.g., slides, whiteboard) in the video conference. Each of the video images of the participants includes a face portion of the participant and a background. The video images of the participants may be captured by a camera of one or more of the conferencing devices 220-240. For example, in one embodiment, the video images can be captured by the camera of the conferencing device 240. The presentation content may be captured by the camera of the conferencing device 240. The presentation content may also be captured by a screen snapshot (e.g., screen sharing) by the conferencing device 240. The video images may be packed into RTP packets and transmitted to the MCU in a RTP stream. The presentation content may also be packed into RTP packets and then transmitted to the MCU in, for example, another RTP stream. The RTP packet includes a header portion and a payload portion. The video images of the participants and the presentation content are included in the payload portion of the RTP packet. The header portion includes an identifier which is used to indicate the type of media content in the payload portion. For example, the header portion can include an identifier indicate that the media content in the payload portion is video image of participant or presentation content. By way of this configuration, the MCU or the mobile phone 210 can distinguish the types of the media content after receiving the RTP packets. It should be appreciated that during transport, the RTP packet (header and payload) is entirely encapsulated within a payload of a User Datagram Protocol (UDP) packet. In turn, the UDP packet is entirely encapsulated within a payload of an internet protocol (IP) packet.

The MCU receives the two RTP streams, decodes each packet included in the received two RTP streams, composes new RTP packets respectively representative of the video images of the participants and the presentation content and transmits the RTP packets to one or more of the conferencing devices 210-230. Similar to the RTP packets sent by the conferencing device 240 to the MCU, each of the RTP packets sent from the MCU include an identifier included in the header portion to indicate the type of the media content in the payload portion of the RTP packet.

At step 403, the mobile phone 210 decodes the media contents included in the RTP packets. In this step, the mobile phone 210 obtains the video images of the participants from the payload portions of some RTP packets, and obtains the presentation content from the payload portions of some other RTP packets. The mobile phone 210 then sends the video images of the participants and the presentation content to a decoder in the mobile phone 210 for decoding. After the decoding, the mobile phone obtains the decoded video images of the participants and the presentation content.

At step 405, the mobile phone 210 identifies and extracts key elements (e.g., objects/regions of attention) in the video images of the participants and/or in the presentation content. The key elements can be identified and extracted with object recognition and segmentation. The object recognition is used to identify a particular type of object. The object segmentation is used to separate the foreground object (e.g. face in the video image, text in the presentation) from the background. The algorithms for recognition and segmentation may be algorithms in the art and would not be discussed in detail in the embodiments of the present invention.

In this step, the mobile phone 210 first analyzes the types of the decoded media contents. For example, the mobile phone 210 can identify the types of the media contents, e.g., the video images of participants and presentation content, from the identifiers included in the head portions of the RTP packets. Then the mobile phone 210 identifies the key elements in the video images of the participants and the presentation content. For example, for the video images of the participants, the faces of the participants may be the key elements. For the presentation content, the texts, icons or pictures in the presentation may be the key elements. It is noted that, the key elements can be any other objects included in the media contents. In one example, the whole presentation (e.g., the whole slide) could be the key element (without the need of extraction in this situation). The identification can be done either fully automatically or semi-automatically with certain user interactions. In one sample, a user can point at a specific location of a video frame in the media contents to identify or help identify the key elements. Accordingly, the mobile phone 210 identifies the key elements based on the location of the point received.

After the key elements are identified, the mobile phone 210 extracts the key elements from the rest in a frame, i.e., regions of low attention. In various embodiments, the faces of the participants are key elements in the video images of the participants, and the texts in the presentation are the key elements in the presentation content. As a result, the faces of the participants and texts in the presentation may be clearly visible.

Figure 5:
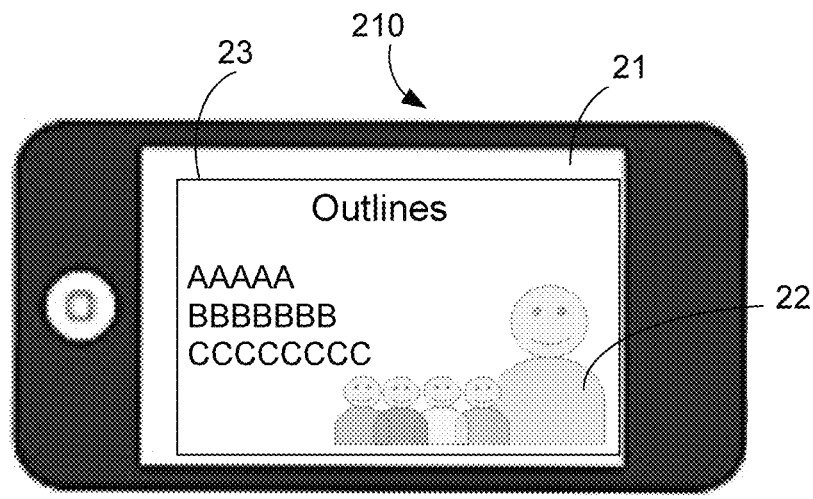
FIGS. 5-6 illustrate various implementations of displaying the images of participants and presentation.

At step 407, the mobile phone 210 combines the extracted key elements from the video images of the participants and the presentation content to form a composite image. The purpose of combining the key elements is to re-arrange the spatial locations, re-adjust the looks and perform other visual-audio transformation of the extracted objects to form a composite image. Combing the extracted objects includes overlaying the objects. With personalized user experiences, users (i.e., participants) can choose different ways (e.g., layouts) to overlay the extracted objects. These layouts are exemplary only and do not limit the scope of the method described herein. In one example, the extracted objects are face images of the participants 23 and the whole presentation 22 (e.g., complete slides), which are displayed in the display device 21 of the mobile phone 210, as shown in FIG. 5. In the example of FIG. 5, the algorithm will try to analyze a video frame containing the presentation, and find an empty space that is not occupied by text, icon, or picture for overlaying the participants' face images. However, if the space is too small, or the presentation is full of text, and there's no empty space to overlay face images, the mobile phone 210 can have a semi-transparent overlay of the face images, so that the texture will be mixed together with face images. Alternatively, the mobile phone 210 can shrink the presentation to leave a space for overlaying the face images of the participants, so that there's a minimum interference between the face images and the presentation.

Figure 6:
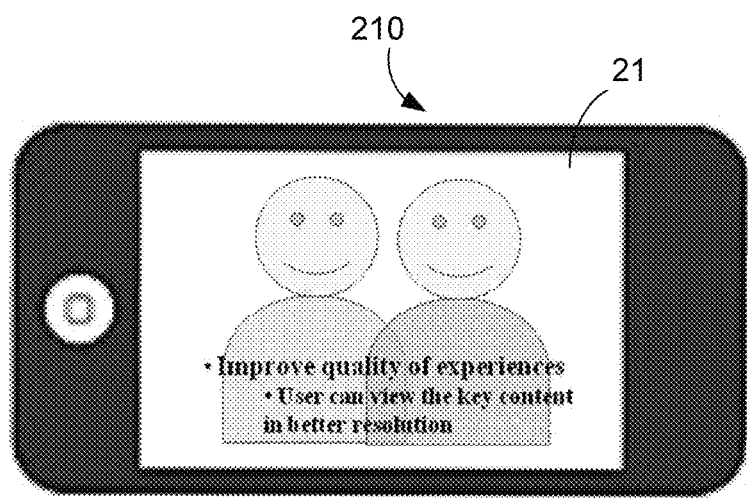

In another example, the extracted objects are face images of the participants, and the text in the presentation, as shown in FIG. 6. In the example of FIG. 6, the text of the presentation and the face images of the participants are overlaid in a non-intrusive fashion, i.e., they do not totally block the visible content of the other objects. To realize this kind of configuration, a three-class instead of a two-class object classification may be done. The extracted objects can be classified into three classes, e.g., object of attention, object of low attention, and object of medium attention. The object of attention may be overlaid on top of either object of low attention or object of medium attention.

Content alignment and color harmonization, for example can be done to improve the visual quality of the composite image. The algorithm of adjusting the color distribution of foreground to background with eight harmonic hue templates by Cohen-Or published in Proceedings of ACM SIGGRAPH 2006 for instance is a possible algorithm for color harmonization. It is noted that existing tools and algorithms can be adopted or improved to complete this step. The embodiments of the present invention do not limit the algorithms or methods for that. In many cases, silency based analysis and motion estimation can enhance the quality of output stream. Methods and algorithms discussed in an U.S. patent application Ser. No. 13/069,136, filed Mar. 22, 2011, and titled, "Media Processing Devices for Detecting and Ranking Insertion Points in Media, and Methods Thereof" may be adjusted and employed in the embodiments of the present invention.

After the key elements are overlaid, position, color, shape, texture, and other features of the key elements in the composite image may be further optimized to enhance the quality of experience of the composite image. Dynamic registration using detection and tracking, motion filtering, and smooth transition can be adopted to improve the quality of experience, to reduce shaking effect and improve the smoothness of the transition. Different dynamic registration algorithms can be employed in the embodiments of the present invention. The present invention does not limit the type of the dynamic registration algorithms. Optionally, as an input of the optimization, a quality score for the video signal with automatic video analysis can be used for optimizing the video quality.

Furthermore, the mobile phone 210 may adjust the composite image to conform to a specification of the mobile phone 210. The specification may include a requirement, capability, preference, setting, or other specification that optimizes viewing. For example, the resolution or size of the composite image may be adjusted. In one implementation, the video signal sent by the MCU may respectively include an image of participant and presentation with a resolution conforming to a large-size display device (e.g., the image of participant and presentation are sent by the telepresence system 240 to the MCU). Since the mobile phone 210 has a display device with a low resolution, the mobile phone 210 adjusts the resolution of the composite image to correspond to a small-size display device. Then the mobile phone 210 sends the composite image to the display device for display. Accordingly, the mobile phone 210 may adjust the composite image to include the optimum or acceptable video for a small-size display device of a mobile phone.

In another implementation, the mobile phone 210 may adjust the display size of the composite image to fit on the small screen. For example, surrounding regions for a life size image are clipped so that the image may be displayed smaller than life size with desired resolution so as to avoid rending the video signal unclear or fuzzy.

At step 409, the display device of the mobile phone 210 display the composite image, as shown in FIG. 5 or FIG. 6. The face images of the participants and the presentation (e.g., the text) can be displayed within one graphical user interface (GUI) window; alternatively, the face images of the participants and the presentation can also be displayed in different GUI windows. If two GUI windows are used, the two windows may be overlapped and the smaller window is located inside the bigger window.

Even though the method in FIG. 4 is performed at the mobile phone 210, the method for performing a video conference in a mobile phone may also be performed remotely, e.g., by the MCU, or any other intervening equipment between the conferencing devices of the video conference, as desired. For example, in one embodiment, the MCU may receive a plurality of video streams including video images of participants and presentation contents from the conferencing devices. The MCU identifies the key elements (e.g., objects/regions of attention) from the video streams, extracts the key elements and overlays the key elements to form a composite image. The MCU may adjust the composite image to conform to a particular display device, e.g., a small-size display device of the mobile phone, and then sends the adjusted composite image to the mobile phone for display.

The various embodiments described herein are described in the general context of method steps or processes, which may be implemented in one embodiment by a computer program product which is accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

What is claimed is:

1. A mobile phone for use in a video conference in which a plurality of conferencing devices display a presentation content and a video image of one or more participants in the video conference, the mobile phone comprising:
    a receiver configured to receive a first real-time transport protocol (RTP) packet including a video image of a participant, and a second RTP packet including a presentation content presented in the video conference, wherein the video image of the participant includes a face portion of the participant and a background portion; and
    a processor connected to the receiver and configured to perform steps of:
        decoding the video image of the participant and the presentation content;
        extracting the face portion of the participant from the video image of the participant;
        overlaying the face portion of the participant over a portion of the presentation content to form a composite image; and
        sending the composite image to a display device of the mobile phone for display.

2. The mobile phone according to claim 1, wherein the portion of the presentation content contains text,
    wherein the step of overlaying includes overlaying the face portion of the participant over the text.

3. The mobile phone according to claim 2, wherein the text is extracted from the presentation content by the processor.

4. The mobile phone according to claim 1, wherein the processor is further configured to perform a step of:
    identifying an empty space which is not occupied by a text or a picture in the presentation content,
    wherein the step of overlaying includes overlaying the face portion of the participant over the empty space in the presentation content.

5. The mobile phone according to claim 1, wherein the processor is further configured to perform a step of:
    scaling down the composite image in order to fit a size of the display device of the mobile phone.

6. The mobile phone according to claim 5, wherein the processor is further configured to perform a step of:
    reducing a resolution of the composite image to correspond to the display device of the mobile phone.

7. A method for performing a video conference in a mobile phone, the video conference involving a plurality of conferencing devices that display a presentation content and a video image of one or more participants in the video conference, the method comprising:
    receiving a first and second real-time transport protocol (RTP) packets including a video image of a participant and a presentation content in the video conference, respectively, wherein the video image of the participant includes a face portion of the participant and a background portion;
    decoding the video image of the participant and the presentation content;
    extracting the face portion of the participant from the video image of the participant;
    overlaying the face portion of the participant over a portion of the presentation content to form a composite image; and
    displaying the composite image on a display device of the mobile phone.

8. The method according to claim 7, wherein the portion of the presentation content contains text,
    wherein the step of overlaying includes overlaying the face portion of the participant over the text.

9. The method according to claim 8, the text is extracted from the presentation content.

10. The method according to claim 7, further comprising:
    identifying an empty space which is not occupied by a text or a picture in the presentation content,
    wherein the step of overlaying includes overlaying the face portion of the participant over the empty space in the presentation content.

11. The method according to claim 7, further comprising:
    scaling down the composite image in order to fit a size of the display device of the mobile phone.

12. The method according to claim 11, further comprising:
    reducing a resolution of the composite image to correspond to the display device of the mobile phone.

13. A non-transitory computer-readable medium storing instructions executable by a processor in a mobile phone to perform steps comprising:
    receiving a first and second real-time transport protocol (RTP) packets including a video image of a participant and a presentation content in the video conference, respectively, wherein the video image of the participant includes a face portion of the participant and a background portion;
    decoding the video image of the participant and the presentation content;
    extracting the face portion of the participant from the video image of the participant;
    overlaying the face portion of the participant over a portion of the presentation content to form a composite image; and
    displaying the composite image on a display device of the mobile phone.

14. The non-transitory computer-readable medium according to claim 13, wherein the portion of the presentation content contains text,
    wherein the step of overlaying includes overlaying the face portion of the participant over the text.

15. The non-transitory computer-readable medium according to claim 14, wherein the text is extracted from the presentation content.

16. The non-transitory computer-readable medium according to claim 13, the steps further comprises:
    identifying an empty space which is not occupied by a text or a picture in the presentation content, wherein the step of overlaying includes overlaying the face portion of the participant over the empty space in the presentation content.

17. The non-transitory computer-readable medium according to claim 13, wherein the steps further comprises:
scaling down the composite image in order to fit a size of the display device of the mobile phone.

18. The non-transitory computer-readable medium according to claim 17, wherein the steps further comprises:
reducing a resolution of the composite image to correspond to the display device of the mobile phone.

* * * * *